United States Patent
Welter

(10) Patent No.: US 9,441,283 B2
(45) Date of Patent: Sep. 13, 2016

(54) PROCESS FOR COMPLEX PROCESSING OF BAUXITE

(71) Applicant: PLEASON VENTURES LTD, Limassol (CY)

(72) Inventor: Alexander Welter, Hannover (DE)

(73) Assignee: Pleason Ventures Ltd., Limassol (CY)

(*) Notice: Subject to any disclaimer, the term of this patent is extended or adjusted under 35 U.S.C. 154(b) by 84 days.

(21) Appl. No.: 14/582,768

(22) Filed: Dec. 24, 2014

(65) Prior Publication Data
US 2016/0186289 A1   Jun. 30, 2016

(51) Int. Cl.
| | | |
|---|---|---|
| *C01F 7/00* | (2006.01) | |
| *C22B 3/44* | (2006.01) | |
| *C22B 21/04* | (2006.01) | |
| *C01F 7/04* | (2006.01) | |
| *C01G 49/02* | (2006.01) | |
| *C22B 1/00* | (2006.01) | |
| *C22B 3/00* | (2006.01) | |

(52) U.S. Cl.
CPC . *C22B 3/44* (2013.01); *C01F 7/04* (2013.01); *C01G 49/02* (2013.01); *C22B 1/00* (2013.01); *C22B 3/00* (2013.01); *C22B 21/04* (2013.01)

(58) Field of Classification Search
None
See application file for complete search history.

(56) References Cited

U.S. PATENT DOCUMENTS

| | | | |
|---|---|---|---|
| 3,442,795 A | | 5/1969 | Kerr et al. |
| 4,468,375 A | * | 8/1984 | Misra .............. C01F 7/0613 423/115 |
| 5,628,972 A | | 5/1997 | Deville et al. |

FOREIGN PATENT DOCUMENTS

WO       2008141423      11/2008

OTHER PUBLICATIONS

Papassiopi N et al: "Effectiveness of iron reducing bacteria for the removal of iron from bauxite ores", Minerals Engineerng, Pergamon Press, Oxford, GB, Bd. 23, Nr. 1, Jan. 1, 2010, pp. 25-31, XP026736300, ISSN: 0892-6875.

* cited by examiner

*Primary Examiner* — Steven Bos
(74) *Attorney, Agent, or Firm* — Arent Fox LLP; Michael Fainberg

(57) ABSTRACT

Method for processing bauxite, including grinding the bauxite and extracting iron; separating the resulting pulp into a solid phase and a liquid phase; extracting aluminum from the liquid phase at a pH of about 7 to 8 to form a precipitate of sodium hydrogen carboaluminate; separating the precipitate of sodium hydrogen carboaluminate from the neutralized pulp; extracting iron from the neutralized liquid phase at a pH of at least about 12 using to form a precipitate of iron hydroxide; separating the precipitate of iron hydroxide from the basic pulp to form an iron ore concentrate and a mother liquor chelate; concentrating the mother liquor chelate using evaporation; cooling the concentrated solution; carbonizing the cooled solution with gaseous carbon dioxide under pressure to crystallize sodium hydrogen carbonate; and separating the crystallized sodium hydrogen carbonate from the carbonized solution to form a chelate liquid phase and a sodium hydrogen carbonate solid phase.

11 Claims, 2 Drawing Sheets

PROCESS FOR COMPLEX PROCESSING OF BAUXITE

TECHNICAL FIELD

The present invention relates to the metallurgy of nonferrous metals, in certain aspects, the field of producing alumina from bauxites. The method is particularly effective for the processing of siderite-containing bauxites.

BACKGROUND

The principal components of bauxite are aluminium and iron compounds. In the production of alumina from bauxites, the maximum possible fraction of aluminium oxide is recovered, whereas all iron compounds are stockpiled; up to a million tons per year of iron oxide can accumulate in some alumina production units. The separation of the iron compounds in the production of alumina leads not only to an improvement in the process parameters of the working steps for concentrating and washing red mud or for sintering the mud batch, but also has a positive environmental influence by extending the lifetime of mud fields.

Processes are known for separating iron both from bauxite and from red mud. In the Pedersen Process, a mixture of bauxite and calcium oxide is melted in an electric arc furnace at a temperature of 1500° C. to produce pig iron and aluminium-calcium slag that is further processed hydrometallurgically to produce alumina (see Ni L. P., Goldman M. M., Solenko T. V. Pererabotka vysokoželezistych boksitov—Metallurgija, M., 1979, S. 203).

The modified sequential variant of the Bayer Process is also known. The process involves sintering with an intermediate step of iron separation by melting red mud in the presence of a reducing agent at a temperature of 1250-1300° C. according to the Krupp-Renn Process with magnetic separation of iron, sintering the slag with limestone and soda at 1200° C., leaching the sinter cake in order to obtain a sodium aluminate solution and using the mud to produce cement (ibid., p 205).

The process of magnetizing calcination of siderite-containing bauxite is known for the purpose of siderite decomposition and the conversion of the iron compounds into magnetic compounds with their subsequent recovery by means of magnetic separation (ibid., p 215).

The above processes for the separation of iron from both bauxite and red mud require pyrometallurgical steps of calcination and melting, thereby necessitating an increase in constructional capital costs and in running costs for energy sources and the reducing agent. The pyrometallurgical process steps are linked with considerable environmentally harmful emissions.

One solution is a process for the extraction of aluminium and iron from aluminium-containing ores (see U.S. Pat. No. 2,155,919). Processes for the extraction of aluminium and iron ions from aluminum-containing ores are described in this patent document. The ore extraction process includes leaching roasted ore with the use of acid to produce a leachate and a solid precipitate. The leachate has aluminium and iron ions in solution. The process for recovering the aluminium ions from a mixture that comprises the Iron and aluminium ions involves recovery of the aluminium ions, an organic solvent and an extractant that is capable of producing an organometallic complex essentially selectively with the iron or aluminium ions, which are soluble in the organic solvent.

The disadvantage of this process is in the need for the ore roasting and in the difficulty of recovering the acid in the course of the leaching, all of which requiring an increased energy output and being very environmentally harmful.

SUMMARY

An object of the present invention includes increased efficiency for bauxite processing, as well as the processing of siderite-containing bauxites for the production of alumina and for commercial iron ore concentrate.

An industrial result includes the separation of iron compounds in the form of a commercial product in the first step of the bauxite processing to alumina according to a Bayer process or according to a Bayer sintering process.

In certain example aspects, the invention is directed to a method for processing bauxite, comprising grinding the bauxite using a circulating chelate solution and heating the ground bauxite solution to extract iron and forming a pulp comprising an iron chelate and an aluminium chelate; separating the pulp into a solid phase enriched in bauxite and into a liquid phase comprising the iron chelate; extracting aluminium from the liquid phase at a pH of about 7 to about 8 using circulating sodium hydrogen carbonate to form a precipitate of sodium hydrogen carboaluminate and forming a neutralized pulp, separating the precipitate of sodium hydrogen carboaluminate from the neutralized pulp to form a neutralized liquid phase; extracting iron from the neutralized liquid phase at a pH of at least about 12 using a hydroxide composition to form a precipitate of iron hydroxide, and forming a basic pulp; separating the precipitate of iron hydroxide from the basic pulp to form an iron ore concentrate and a mother liquor chelate; concentrating the mother liquor chelate using evaporation; cooling the concentrated mother liquor chelate; carbonizing the cooled solution with gaseous carbon dioxide under pressure to crystallize sodium hydrogen carbonate; separating the crystallized sodium hydrogen carbonate from the carbonized solution to form a chelate liquid phase and a sodium hydrogen carbonate solid phase.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
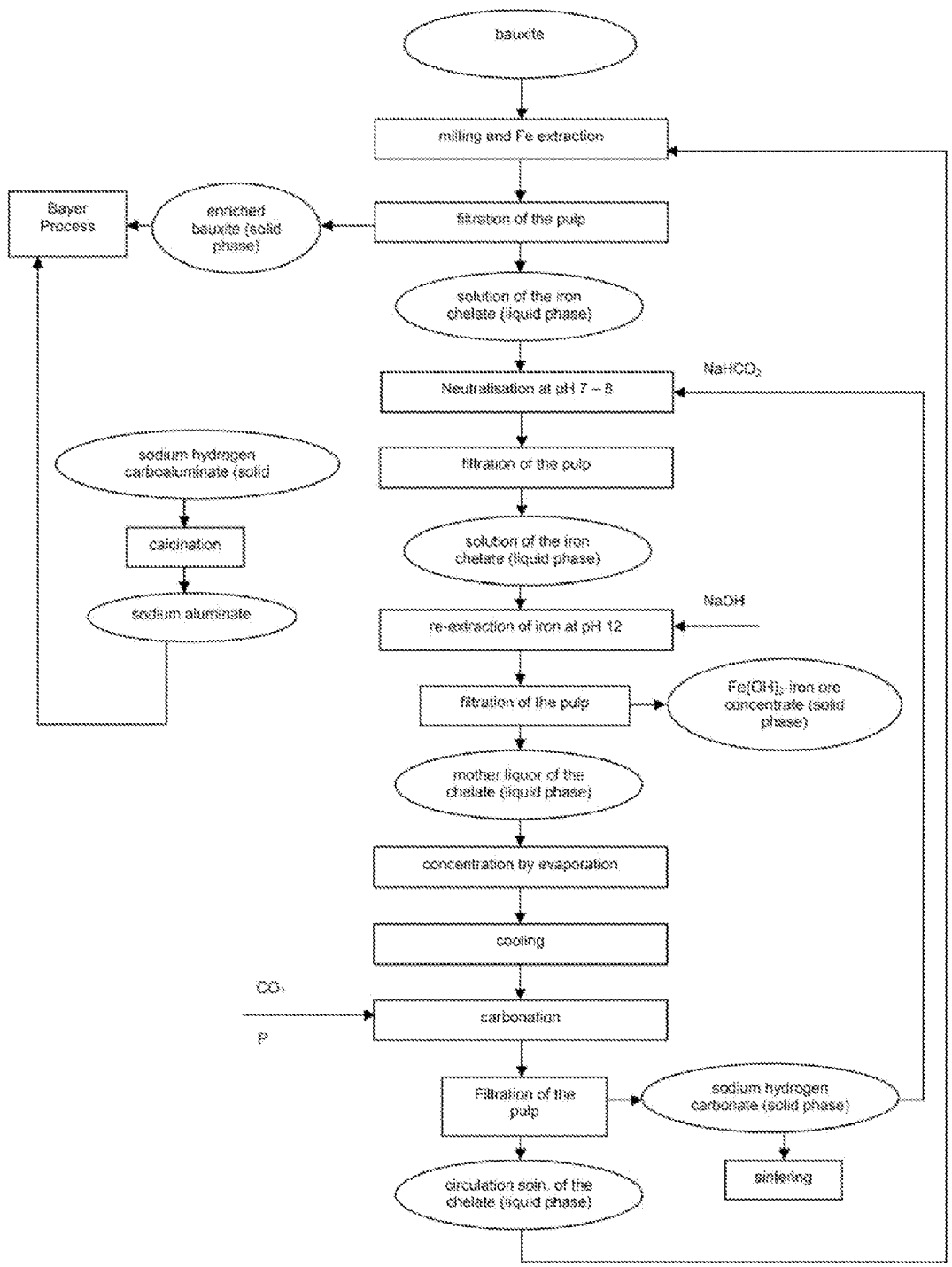
FIG. 1 illustrates a basic processing scheme according to certain example aspects of the invention.

A basic process scheme according to certain example aspects of the invention is illustrated in FIG. 1. As shown in FIG. 1, Bauxite may be milled using a circulating solution of chelate, for example, a mixture of the sodium salt of ethylenediaminetetraacetic acid and a weak acid, for example, acetic acid. Warming the suspension can result in the iron separation of iron-containing compounds from bauxites with the formation of an iron chelate as follows:

$$Fe_2O_3 + 2Na_2H_2edta + 2CH_3COOH \leftrightarrow 2Na[Fe\ edta] + 2CH_3COONa + 3H_2O \qquad [1]$$

$$FeCO_3 + Na_2H_2edta \leftrightarrow Na_2[Fe\ edta] + H_2O + CO_2 \qquad [2]$$

In addition to the iron chelate, minor quantities of the aluminium chelate Na[Al edta] may also be formed. After the iron separation, the suspension is separated into a solid phase, an enriched desideritised (e.g., free or substantially free of siderite) bauxite, that may be further processed by any known process for alumina, and into a liquid phase that may be decomposed by a change (e.g., a double change) in pH of the solution. The iron chelate may be neutralized at about pH 7-8 with circulating sodium hydrogen carbonate, wherein sodium hydrogen carboaluminate precipitates and may be removed from the solution as follows.

$$Na[Al\ edta] + 4NaHCO_3 \leftrightarrow NaAl[CO_3](OH)_2\downarrow + Na_4edta + 3CO_2 + H_2O \qquad [3]$$

The renewed extraction of iron from the iron chelate may occur at a pH of the solution of up to about 12 with the precipitation of iron hydroxide as follows:

$$Na[Fe\ edta] + 3NaOH \leftrightarrow Fe(OH)_3\downarrow + Na_4\ edta \qquad [4]$$

$$Na_2[Fe\ edta] + 2NaOH \leftrightarrow Fe(OH)_2\downarrow + Na_4\ edta \qquad [5]$$

The suspension may then be separated, namely into iron hydroxide as the solid phase that represents the commercial product, and into a liquid phase, the mother liquor of the chelate. The mother liquor of the chelate may then be concentrated by evaporation, cooled and carbonated with gaseous carbon dioxide under a pressure of at least about 16 bar so as to crystallize out any sodium hydrogen carbonate as follows:

$$Na_4edta + 2CO_2 + 2H_2O \rightarrow Na_2H_2edta + 2NaHCO_3\downarrow \qquad [6]$$

$$CH_3COONa + CO_2 + H_2O \leftrightarrow CH_3COOH + NaCHO_3\downarrow \qquad [7]$$

The suspension may then be separated into a liquid phase, the circulating solution of chelate, and a solid phase, that represents the sodium hydrogen carbonate. The solid phase may be separated into two streams, namely into a circulating stream for neutralization and into a second stream that is an outlet and is, for example, supplied to sintering of the alumina batch.

The sodium hydrocarboaluminate may be calcined at a temperature of about 700-900° C. with the formation of sodium aluminate as follows:

$$NaAl[CO_3](OH)_2 \rightarrow Na_2OAl_2O_3 + CO_2\uparrow + H_2O\uparrow \qquad [8]$$

The solid sodium aluminate may then be fed to the production of alumina.

Figure 2:
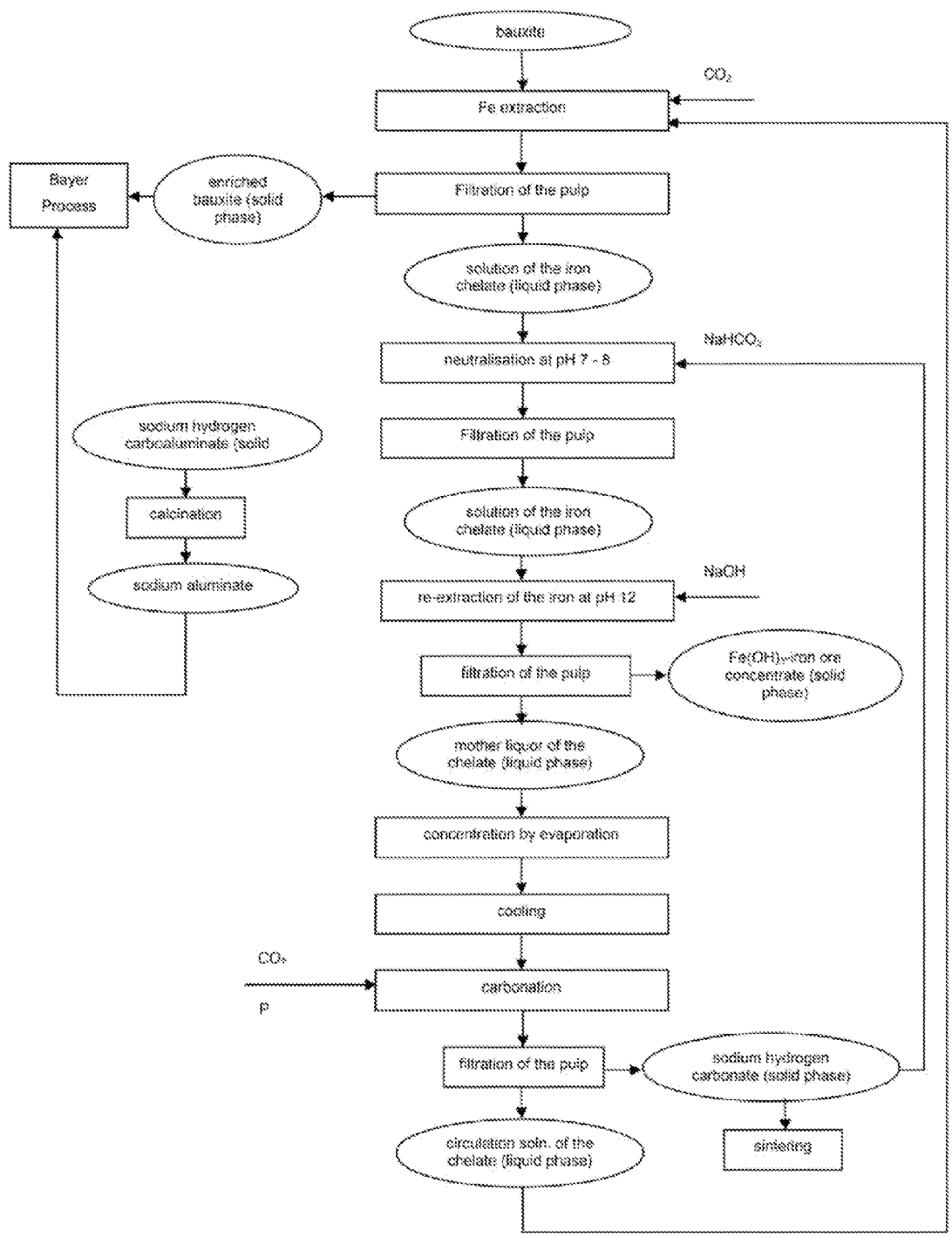
FIG. 2 illustrates a processing scheme according to various example aspects of the invention.

Another processing scheme according to various example aspects of the invention is illustrated in FIG. 2. Bauxite may be ground by using a circulating solution of chelate (e.g., sodium salt of ethylenediaminetetraacetic acid). Warming the suspension under carbonation with $CO_2$ under a pressure of at least about 16 bar may then result in the iron separation of iron-containing compounds from the bauxite with the formation of iron chelate as follows:

$$Fe_2O_3 + 2Na_2H_2edta + 2CO_2 \leftrightarrow 2Na[Fe\ edta] + 2NaHCO_3 + H_2O \qquad [9]$$

$$FeCO_3 + Na_2H_2edta \leftrightarrow Na_2[Fe\ edta] + CO_2 + H_2O \qquad [10]$$

The chelate may be decomposed and the renewed iron separation carried out as in the basic processing scheme discussed above with reference to FIG. 1.

After the renewed iron separation, the suspension may be separated, namely into iron hydroxide as the solid phase representing, for example, a commercial product, and into a liquid phase, that is, the mother liquor of the chelate. The mother liquor of the chelate may then be concentrated by evaporation, cooled and carbonated with gaseous carbon dioxide under pressure so as to crystallize out sodium hydrogen carbonate as follows:

$$Na_4edta + 2CO_2 + 2H_2O \rightarrow Na_2H_2edta + 2NaHCO_3\downarrow \qquad [11]$$

The process may then continue as in the basic processing scheme discussed above with respect to FIG. 1.

The processes in accordance with various aspects of the invention ensure the complex processing of bauxite with the production of metallurgical alumina and conditioned iron ore raw material.

Example 1

A siderite-containing bauxite sample was used for the experiment. The chemical composition of the bauxite is shown in Table 1.

The bauxite sample was milled in a laboratory mill and treated with the solution of a mixture of the disodium salt of ethylenediaminetetraacetic acid at a concentration of 150 g/dm$^3$ and 70 g/dm$^3$ acetic acid for the iron separation.

Extraction Conditions:
weight ratio liquid:solid in the initial suspension of the solution, and the weight ratio liquid:solid of the bauxite solution is 14.5.
Time 1 hour.
Temperature 100° C.

After the extraction, the suspension was separated by filtration and the solid precipitate was washed. The solid precipitate represents the enriched $CO_2$-free bauxite. The liquid phase, that is, the solution of the iron chelate, was neutralized with sodium hydrogen carbonate to a pH of 7.5, whereupon the sodium hydrogen carboaluminate precipitated out. The precipitate was filtered off and washed.

A caustic liquor was added to the neutralized solution of the iron chelate in order to increase the pH of the solution to 12. This caused the iron chelate to decompose and the iron-containing product precipitated out. The precipitate was filtered off and washed.

Decomposition Conditions:
Temperature 100° C.
Time 5 hours.

The hydrogen aluminocarbonate was calcined at a temperature of 750° C. for 30 minutes and formed solid sodium aluminate.

The composition of the initial bauxite and the resulting products are presented in Table 1.

Example 2

A siderite-containing bauxite sample was used for the experiment. The chemical composition of the bauxite is shown in Table 2.

The bauxite sample was milled in a laboratory mill and treated with the solution of the disodium salt of ethylenediaminetetraacetic acid at a concentration of 120 g/dm$^3$ for the iron separation.

Extraction Conditions:
weight ratio liquid:solid in the initial suspension of the solution, and the weight ratio liquid:solid of the bauxite solution is 14.5.
Time 5 hours.
Temperature 120° C.
$CO_2$ pressure 40 bar.

After the extraction, the suspension was separated by filtration and the solid precipitate was washed. The solid precipitate represents the enriched $CO_2$-free bauxite. The liquid phase, that is, the solution of the iron chelate, was neutralized with sodium hydrogen carbonate to a pH of 7.5, whereupon the sodium hydrogen carboaluminate precipitated out. The precipitate was filtered off and washed. A caustic liquor was added to the neutralised solution of the iron chelate in order to increase the pH of the solution to 12. This caused the iron chelate to decompose and the iron-containing product precipitated out. The precipitate was filtered off and washed.

Decomposition Conditions:
Temperature 100° C.
Time 5 hours.

The hydrogen aluminocarbonate was calcined at a temperature of 750° C. for 30 minutes and afforded solid sodium aluminate.

The composition of the initial bauxite and the resulting products are presented in Table 2.

TABLE 1

Chemical composition of the initial bauxite and the processed products

| Chemical Composition, % | Initial bauxite | Enriched bauxite | Iron-containing Product | Sodium hydrogen carboaluminate | Sodium aluminate |
|---|---|---|---|---|---|
| $Al_2O_3$ | 40.1 | 51.0 | 0.3 | 35.8 | 58.3 |
| $Na_2O$ | 0.5 | 0.15 | 1.2 | 20.6 | 33.6 |
| $SiO_2$ | 10.2 | 12.7 | 0.4 | 3.6 | 5.8 |
| $Fe_2O_3$ | 22.2 | 7.1 | 83.8 | 1.2 | 2.0 |
| $TiO_2$ | 2.3 | 2.7 | 0.1 | — | — |
| $CO_2$ | 1.5 | 0.1 | — | | |

TABLE 2

Chemical composition of the initial bauxite and the processed products

| Chemical Composition, % | Initial bauxite | Enriched bauxite | Iron-containing Product | Sodium hydrogen carboaluminate | Sodium aluminate |
|---|---|---|---|---|---|
| $Al_2O_3$ | 40.1 | 50.4 | 0.4 | 35.8 | 55.5 |
| $Na_2O$ | 0.5 | 0.3 | 0.8 | 20.8 | 32.2 |
| $SiO_2$ | 10.2 | 12.5 | 0.4 | 6.7 | 10.0 |
| $Fe_2O_3$ | 22.2 | 7.1 | 82.6 | 1.2 | 1.7 |
| $TiO_2$ | 2.3 | 2.7 | 0.3 | — | — |
| $CO_2$ | 1.5 | 0.1 | — | | |

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for processing bauxite, comprising:
    grinding the bauxite using a circulating chelate solution and heating the ground bauxite solution to extract iron and form a pulp comprising an iron chelate and an aluminium chelate;
    separating the pulp into a solid phase enriched in bauxite and into a liquid phase comprising the iron chelate;
    extracting aluminium from the liquid phase at a pH of about 7 to about 8 using circulating sodium hydrogen carbonate to form a precipitate of sodium hydrogen carboaluminate and a neutralized pulp,
    separating the precipitate of sodium hydrogen carboaluminate from the neutralized pulp to form a neutralized liquid phase;
    extracting iron from the neutralized liquid phase at a pH of at least about 12 using a hydroxide composition to form a precipitate of iron hydroxide and a basic pulp;
    separating the precipitate of iron hydroxide from the basic pulp to form an iron ore concentrate and a mother liquor chelate;
    concentrating the mother liquor chelate by evaporation;
    cooling the concentrated mother liquor chelate;
    carbonizing the cooled concentrated mother liquor chelate with gaseous carbon dioxide under pressure to crystallize sodium hydrogen carbonate; and
    separating the crystallized sodium hydrogen carbonate from the carbonized cooled concentrated mother liquor chelate to form a chelate liquid phase and a sodium hydrogen carbonate solid phase.

2. The method according to claim 1, wherein the circulating chelate solution is a mixture comprising a sodium salt of ethylenediaminetetraacetic acid or a mixture of ethylenediaminetetraacetic acid and a weak acid.

3. The method according to claim 1, wherein the circulating chelate solution comprises sodium salt of ethylenediaminetetraacetic acid or comprises ethylenediaminetetraacetic acid.

4. The method according to claim 1, wherein carbonizing the cooled solution under pressure comprises a pressure of at least about 16 bar.

5. The method according to claim 1, wherein the step of extracting iron is carried out at a temperature of about 100° C.

6. The method according to claim 1, wherein the hydroxide composition is sodium hydroxide that is metered in to combine with the neutralized liquid phase.

7. The method according to claim 1, wherein the hydroxide composition is a circulating seed crystal solution of the iron hydroxide.

8. The method according to claim 1, comprising processing the solid phase from the step of separating the pulp to form an aluminium-containing solution.

9. The method of claim 8, wherein the step of processing comprises performing a Bayer process.

10. The method according to claim 9, wherein the precipitate of sodium hydrogen carboaluminate is calcined at a temperature of about 700 to about 900° C. to form sodium aluminate that is fed to the Bayer Process.

11. The method according to claim 1, wherein the solid phase is desideritized.

* * * * *